Aug. 11, 1936.     A. A. BLANCHARD     2,050,779
SIGNAL ATTACHMENT FOR VEHICLES
Filed April 20, 1932     3 Sheets-Sheet 1
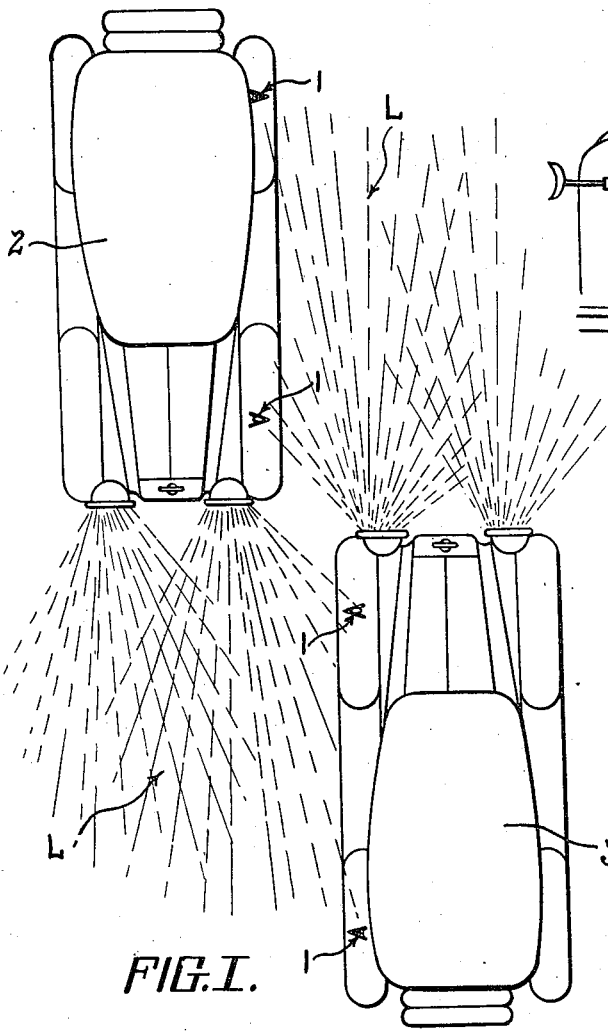
FIG. I.
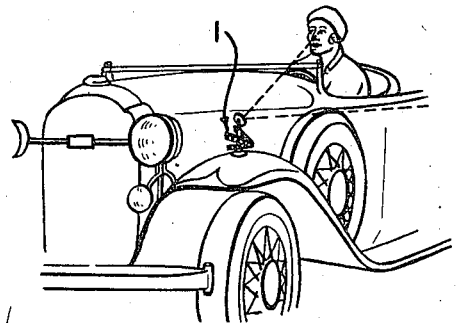
FIG. II.
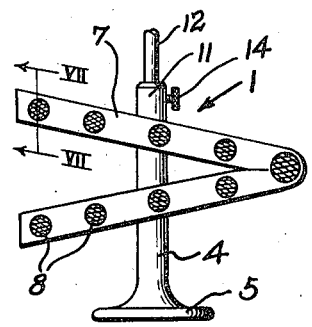
FIG. III.
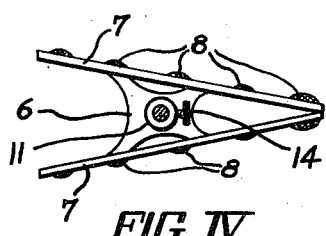
FIG. IV.
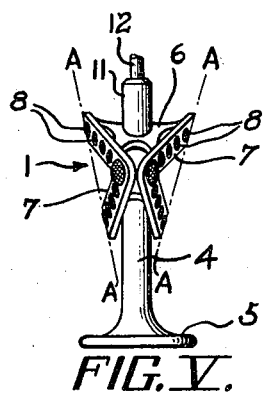
FIG. V.
INVENTOR
ARTHUR A. BLANCHARD.
BY
Louis L. Gagnon.
ATTORNEY

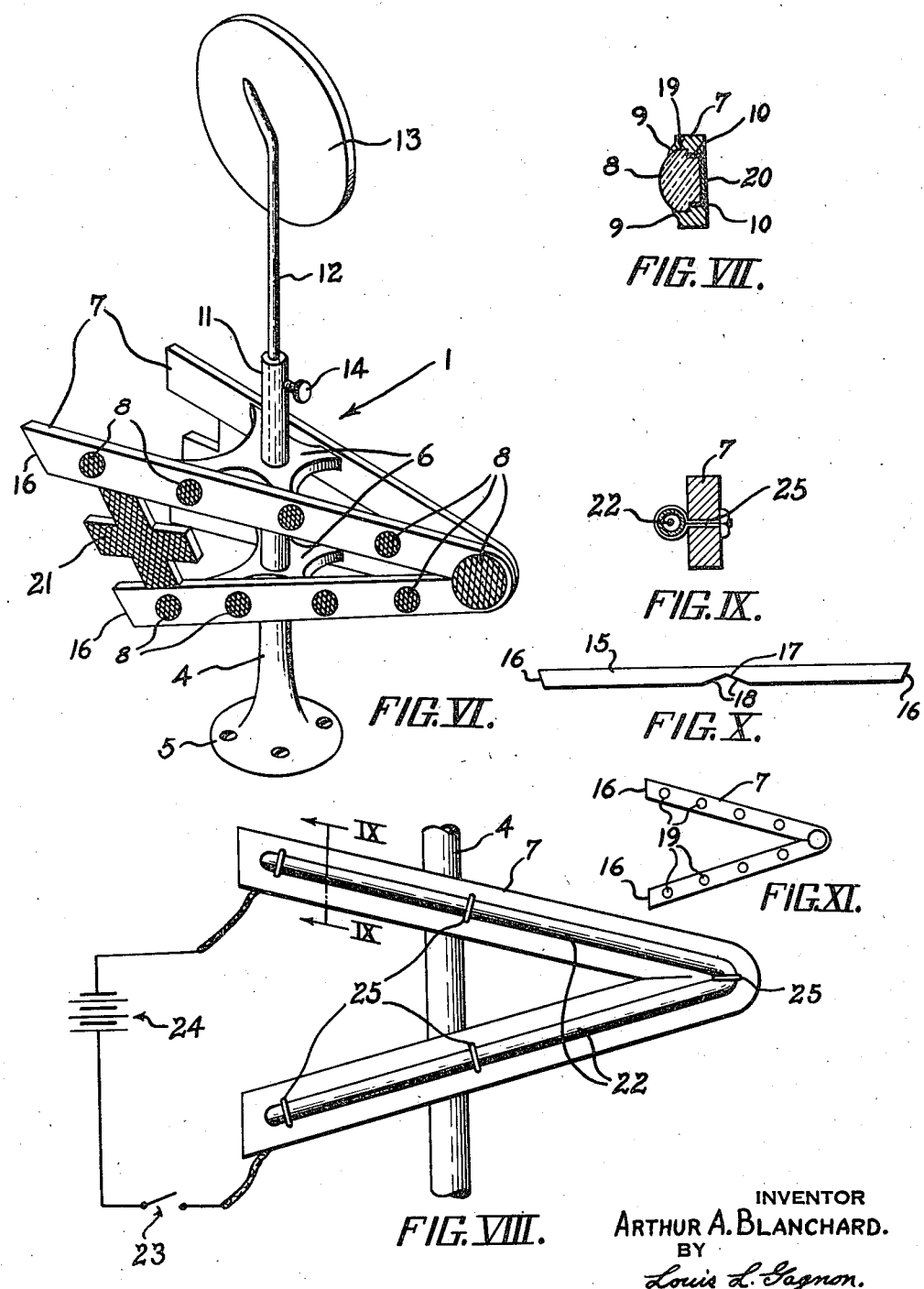

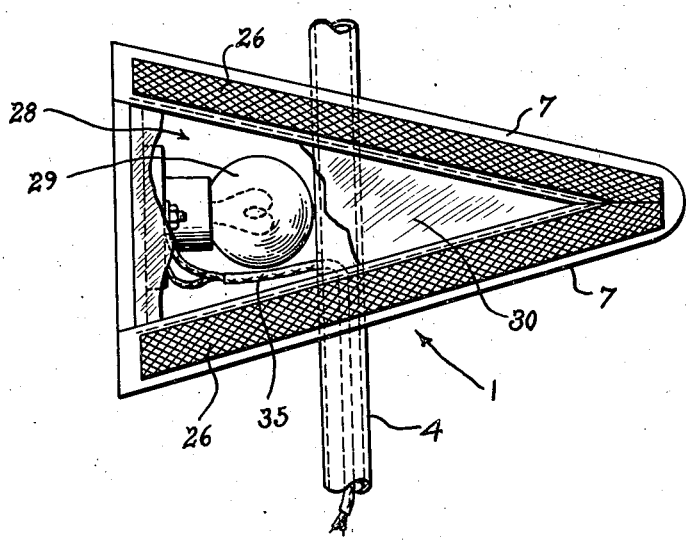
FIG. XII.
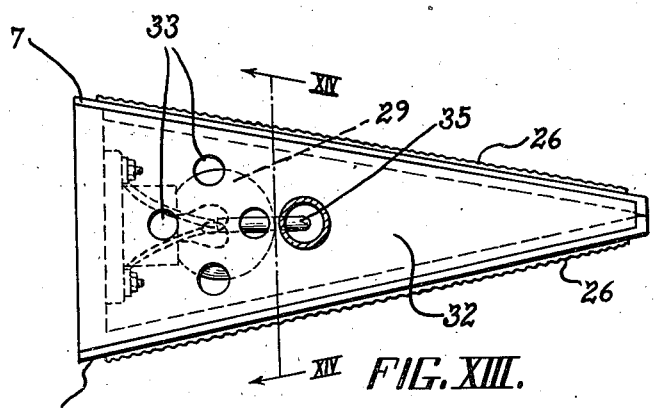
FIG. XIII.
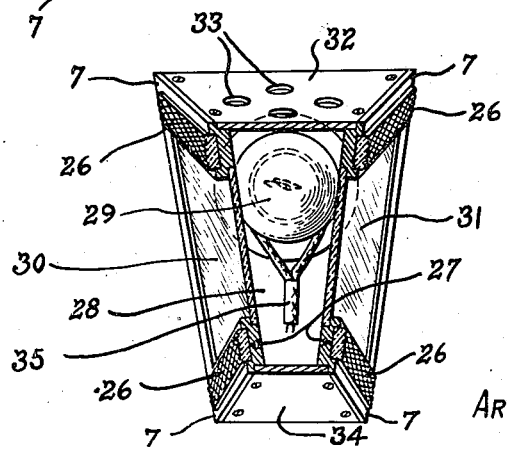
FIG. XIV.

Patented Aug. 11, 1936

2,050,779

UNITED STATES PATENT OFFICE 2,050,779

SIGNAL ATTACHMENT FOR VEHICLES

Arthur A. Blanchard, Southbridge, Mass.

Application April 20, 1932, Serial No. 606,358

5 Claims. (Cl. 88—81)

This invention relates to improvements in attachments for vehicles or the like and has particular reference to improved safety means.

One of the principal objects of the invention is to provide an improved safety device for aiding the safe passage of vehicles at night.

Another object of the invention is to provide an improved device which may be readily attached to a vehicle so that light from a passing vehicle will impinge thereon and be reflected to direct the safe passage of said vehicles.

Another object of the invention is to provide improved means in combination with a device of the above character whereby the operator of a vehicle may have clear vision in a rearward direction.

Another object of the invention is to provide improved means for directing the safe passage of vehicles either from the front, rear or sides.

Another object is to provide improved signal means which will act upon the psychological instinct of an individual operating a vehicle to aid in safely passing another vehicle at night.

Another object is to provide simple, efficient and economical means for reducing the dangers of night driving of vehicles.

Other objects and advantages of the invention will become apparent from the following description taken in connection with the accompanying drawings and it will be apparent that many changes may be made in the details of construction, arrangement of parts and processes shown and described without departing from the spirit of the invention as expressed in the accompanying claims. I, therefore, do not wish to be limited to the exact details of construction, arrangements and processes shown as the preferred forms only have to be shown by way of illustration. It will also be apparent that the devices set forth are adaptable to other arts than the ones specifically described herein and all of which are embodied in this invention.

Referring to the drawings:

Fig. I is a diagrammatic view illustrating the operation of the device embodying the invention;

Fig. II is a fragmentary perspective view showing the device in position on a vehicle;

Fig. III is a side elevation of the device embodying the invention;

Fig. IV is a plan view of the device shown in Fig. III;

Fig. V is a front elevation of the device shown in Fig. III;

Fig. VI is a perspective view of said device;

Fig. VII is a sectional view taken on line VII—VII of Fig. III;

Fig. VIII is a side elevation of a modified form of the invention;

Fig. IX is a sectional view taken on line IX—IX of Fig. VIII;

Fig. X is a side elevation of a bar of material illustrating a step in the process of manufacture;

Fig. XI is a view similar to Fig. X illustrating another step in the process of manufacture.

Fig. XII is a side elevation of another modified form of the invention showing a portion broken away.

Fig. XIII is a plan view of the device shown in Fig. XII; and

Fig. XIV is a sectional view taken on line XIV—XIV of Fig. XIII and looking in the direction of the arrows.

In the past the driving of vehicles, such as automobiles, at night has been very dangerous and in many instances has caused individuals to avoid driving long distances wherein night driving was necessary. Even though near their destination many individuals would stop for the night rather than attempt to drive. This caused a great loss of time, expense and many inconveniences.

One of the primary objects for avoiding night driving in the past has been the difficulty in vehicles passing each other, that is without danger of accident either from collision or from running off the road in attempting safe passage.

The driver's restricted view of oncoming vehicles, due to darkness and to the glare of lights on said vehicles, has made the passage of vehicles at night more or less a matter of guess or judgment.

In many instances misjudgments of position have caused very serious accidents and deaths and for this reason night driving has been very carefully avoided by many individuals.

It, therefore, is one of the prime objects of my invention to provide means by which the safety of night driving will be greatly increased by providing means by which the driver of one vehicle can definitely determine the position of the other.

Referring to the drawings wherein similar reference characters refer to corresponding parts throughout, the invention is directed particularly to signal means I attached to a vehicle 2, preferably on the left side, and in a position wherein the light L from a vehicle 3 passing from the front, rear or side will impinge thereon and be reflected. The object of this device is to provide positive means for indicating the position of the side of the vehicle so that the operator of the passing vehicle can definitely determine the position of his vehicle relative to the other.

The signal device as shown in Figures I and II is mounted on the mud guards in the front and rear of an automobile and is so formed and positioned on said automobile that the light from the headlights of a passing automobile will impinge thereon and be reflected and be visible to the operator of said automobile. This provides definite means by which the said automobiles can safely pass each other.

Although applicant has shown his device as applied to an automobile and to the front and rear thereof it is to be understood that it can be applied to any type of vehicle and that only one of said devices can be employed if desired.

The device in detail comprises a support 4 having a base 5 by means of which the said device may be attached to the vehicle. On each side of the support 4 and attached to said support by X shaped members 6 are a pair of V shaped members 7. The said V shaped members are provided with a plurality of brilliants 8 which are secured thereto by overhanging clip members 9 as shown in Fig. VII or by cement 10 or any suitable means. The support 4 is hollowed adjacent to its end 11 to telescopingly receive a mirror support 12 having a mirror 13 thereon. A thumb screw 14 is employed for holding the said support 12 and mirror 13 at varying heights.

The V shaped members 7, as shown in Fig. V, are angled slightly downward with respect to the support 4 as indicated by the lines A—A to place them at a position wherein the light from a passing vehicle will impinge thereon.

It is to be understood, however, that they may be made straight if desired. This depends mainly upon the position at which they are to be placed on the vehicle.

The brilliants 8 on the V shaped members 7 may be of any desired color such as, for example, green, amber or red. The green and amber are preferably placed on the front V shaped member 7 and the red on the rear V shaped member 7. It is to be understood that the device 1 is in all instances placed so that the red is not visible from the front. The V shaped members 7 are also angled as illustrated in Figures IV and VI so that the said members will converge towards each other at their ends facing outwardly from the vehicle. This is for the purpose of placing the brilliants in the path of light L from a passing vehicle either from the front, rear or sides.

The V shaped members 7, as shown in Figures VII, X, and XI, are preferably made of bar material 15 which is cut to form pieces which are slightly angled at their opposite ends 16. The said pieces are notched intermediate their ends at 17 to aid in bending the material. The sides 18 of the notch 17 are adapted to close together when the bar 15 is bent, as shown in Fig. XI, and are secured together by soldering, welding, etc., or by any suitable means. The angled ends 16 are adapted to lie in the same plane when the bar is bent. A plurality of depressions 19 are formed in the bars, either before or after, the said bars are bent. These depressions are adapted to receive the brilliants 8. The said brilliants may be provided with a rear reflective surface 20 as indicated in Fig. VII, if desired. This depends of course upon the type of brilliant used.

A reflective doctor's sign 21 or any emblem that an individual may choose may be placed between the separated ends 16 of the V shaped members 7 if desired.

In Figures VIII and IX there is shown a slight modification wherein instead of the brilliants 8 a neon member 22 is used. In this particular instance the neon member 22 is adapted to be illuminated manually by a control switch or like means 23 located near the operator and is adapted to be energized by any suitable means such as a battery 24 connected with said members 22. The neon tubes 22 are attached to the V shaped members 7 by any suitable means such as clips 25 and are formed in colors corresponding to the brilliants 8 set forth above.

In Figures XII, XIII, and XIV there is shown a further modification of the invention wherein instead of the plurality of brilliants 8, bars of reflective material 26 are used. The members 26 are secured in grooves 27 in the longitudinal side portions of the V shaped members 7 by any suitable means such as cement, clips, etc. The V shaped members 7 in this particular instance form the frame work of a housing 28 in which an electric lamp 29 is mounted. The front and rear walls 30 and 31 are formed of glass or other suitable material which is transparent or translucent. The front transparent or translucent wall 30 is preferably of a green or amber color and the rear wall 31 is of a red color. The top 32 of the housing 28 is opaque and has a plurality of vent openings 33 therein. The bottom 34 is preferably opaque and may be formed with vent openings if desired.

The housing 28 is secured to the hollow support 4 in a manner similar to the above mentioned devices and may be used in combination with the support 12 and mirror 13 if desired.

The electric lamp is adapted to be energized by a battery or any source of power connected thereto by the lead wires 35 and is controlled by a switch or any suitable means.

The object of this arrangement is to provide combined illuminating and reflective means for aiding the safe passage of vehicles at night.

The bars 26 are adapted to automatically reflect the light which impinges thereon from the head lights of a passing vehicle and operate jointly with the electric lamp 29 which may be illuminated internally of the housing 28 if desired. This provides definite means for aiding the safe passage of vehicles.

The devices set forth above are not only advantageous as signal means for aiding the safe passage of vehicles but also provide means by which the position of the side of an approaching car may be determined in instances when one of the headlights accidentally burns out or becomes disconnected.

It is to be understood that the illumination of the neon members 22 and electric lamp 29 may be controlled by any suitable means and may be permanently illuminated or switched on or off as desired.

Attention is directed to the fact that although applicant shows and describes the use of brilliants and neon tubes it is to be understood that any suitable means may be used such as reflective paints, etc.

It also is to be understood that the said brilliants, etc., may be of any size and shape desired and although arranged to form an arrow, they may be placed in any desired arrangement.

The support 7 for said brilliants, etc., although preferably made to form an arrow, may be of any shape and size desired. They must, however, be placed at a position wherein the light from a passing vehicle will impinge thereon and be reflected or at a position where they will be visible to the operator of said passing vehicles.

When only one of the signal devices 1 is employed it is placed on the vehicle in a position wherein the light from a passing vehicle, either from the front, rear or side, will impinge thereon and yet permit the operator of said first named vehicle to have clear vision in a rearward direction in the mirror 13 supported by said device.

From the foregoing description it will be seen that I have provided simple, efficient and inexpensive means of performing all of the objects of the invention and processes of making the same.

Having described my invention I claim:

1. In a device of the character described a main bar-like upright support, a pair of V shaped support members on said main bar-like support converging towards each other in a direction normal to the longitudinal axis of the main bar-like support and lying in planes which are at an angle to each other in the direction of the longitudinal axis of said main bar-like support and means inlaid in the V arms of said converging supports adapted to cooperate with illuminating means to be rendered brilliantly visible in the dark.

2. In a device of the character described, a support having a hollow portion and attaching means adjacent the lower end of said hollow portion, a plurality of diverging members on said support, said diverging members tapering to a point in a direction substantially normal to the axis of the support and opposite the direction of divergence and lying in planes extending at an angle relative to the longitudinal axis of the support and converging towards the attaching means on said hollow portion, means on said diverging members adapted to cooperate with illuminating means to be rendered brilliantly visible in the dark, a rod-like member extending into said hollow portion and being adjustably secured therein, and reflective means on said rod-like member adjacent its end opposite the end extending into said hollow portion.

3. In a device of the character described, a support having opposed side members attached thereto, said side members each lying substantially in a single plane throughout their length and having upper and lower spaced edge portions converging from one end thereof towards each other adjacent their opposite end in substantially a horizontal direction, the angle of convergence of said lower opposed converging edge portions being less than the angle of convergence of said upper opposed converging edge portions, whereby the planes of the opposed side members will converge towards each other in substantially a horizontal direction and will converge downwardly in a direction substantially normal to the horizontal direction, means for holding said edge portions in said relation and means on at least one of said opposed side members adapted to cooperate with illuminating means to be rendered visible in the dark.

4. In a device of the character described, a support having opposed side members attached thereto, said side members each lying substantially in a single plane throughout their length and having upper and lower spaced edge portions converging from one end thereof towards each other adjacent their opposite end in substantially a horizontal direction, the angle of convergence of said lower opposed converging edge portions being less than the angle of convergence of said upper opposed converging edge portions, whereby the planes of the opposed side members will converge towards each other in substantially a horizontal direction and will converge downwardly in a direction substantially normal to the horizontal direction, means for holding said edge portions in said relation and means on each of the opposed side members adapted to cooperate with illuminating means to be rendered visible in the dark, said last named means when illuminated being adapted to indicate the shape formed by the converging edge portions.

5. In a device of the character described, a housing having spaced side walls and a top and bottom portion, all converging to a common point adjacent one end of the side walls, the angle of convergence of the lower longitudinal edges of the respective spaced side walls being less than the angle of convergence of their respective upper longitudinal edges, whereby the said side walls will converge towards each other in substantially a horizontal direction and will substantially converge downwardly towards the bottom portion, and means on at least one of said side walls adapted to cooperate with illuminating means to be rendered visible in the dark and being adapted to substantially indicate the shape of said converging edges of the side walls.

ARTHUR A. BLANCHARD.